March 24, 1970  J. V. GANZINOTTI  3,501,868
SEALING JOINTS
Filed Oct. 2, 1967  2 Sheets-Sheet 1
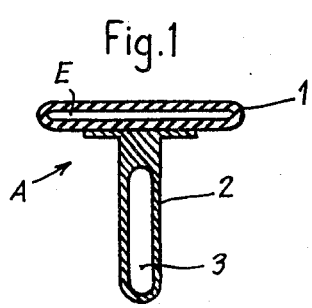
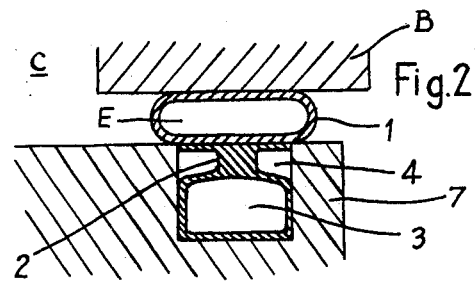
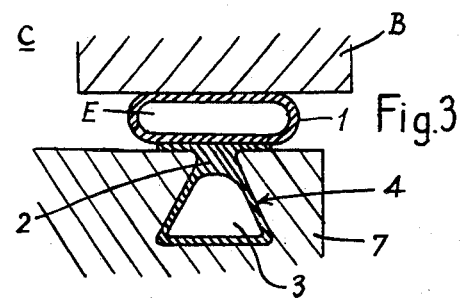
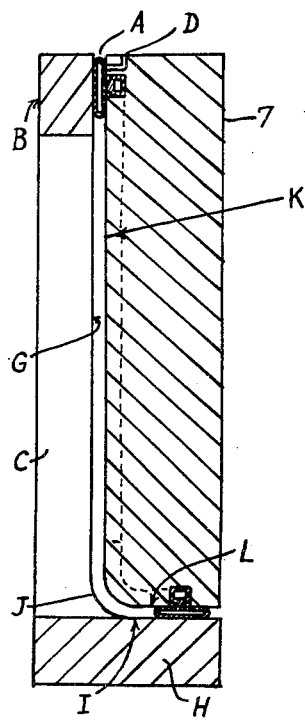
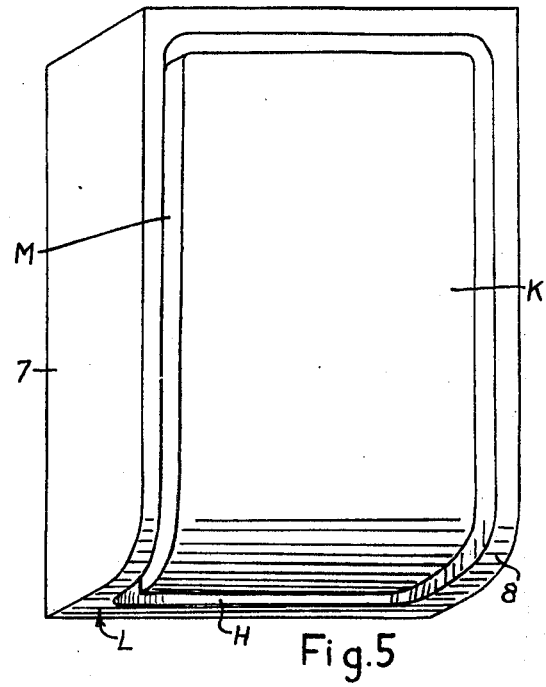

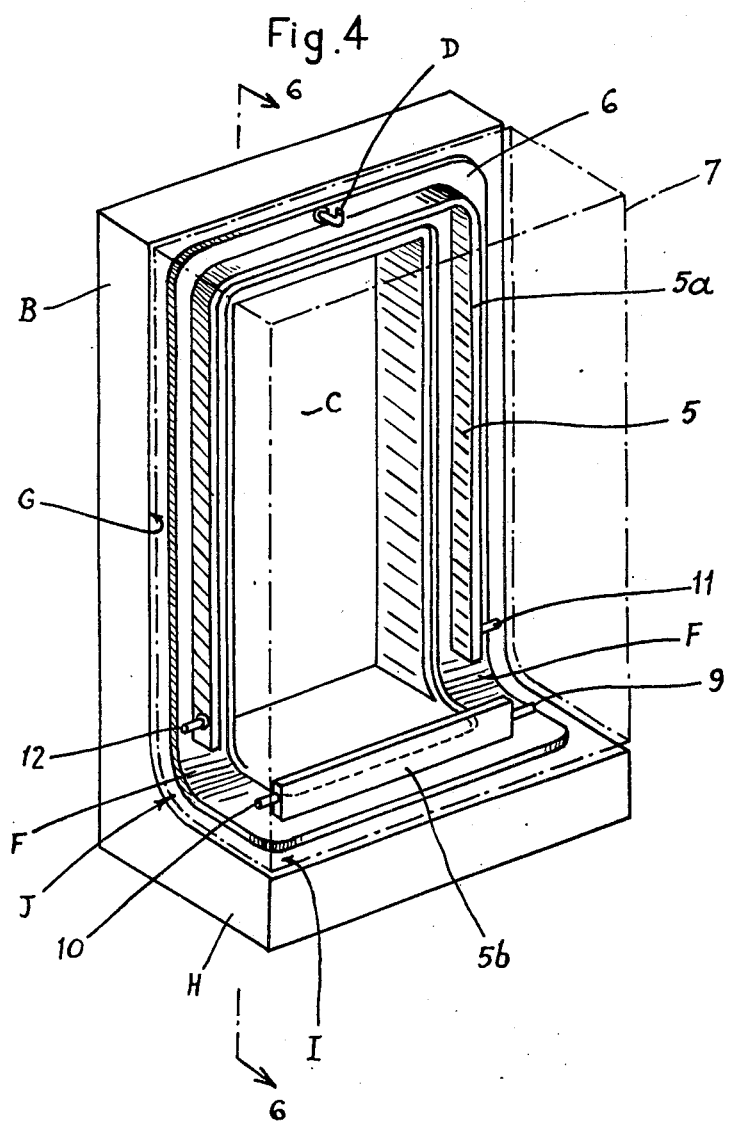

United States Patent Office 3,501,868
Patented Mar. 24, 1970

---

3,501,868
SEALING JOINTS
Jean Victor Ganzinotti, Brive, Correze, France, assignor to Equipment Moderne Industriel par Application du Caoutchouc Manufacture et des Plastiques EMI, Paris, France, a French body corporate
Continuation-in-part of application Ser. No. 427,328, Jan. 22, 1965. This application Oct. 2, 1967, Ser. No. 672,360
Claims priority, application France, Jan. 31, 1964, 962,368
Int. Cl. E06b 7/16; F16j 15/46, E21b 33/00
U.S. Cl. 49—477
10 Claims

ABSTRACT OF THE DISCLOSURE

A sealing joint to close a door sealably against its frame consists of an inflatable sealing part removably anchorable to the perimeter of the door by a protuberance which is separately inflatable. The protuberance is shaped to seat in a groove which is of trapezoid cross-section and the inflatable sealing part rests entirely external to it.

---

The present application is a continuation-in-part of application Ser. No. 427,328 filed Jan. 22, 165 now abandoned.

It is often necessary to replace very rapidly a sealing joint which for some reason has become unsatisfactory in use. Fixing means used up to the present such as gluing or fixing by backing plate prevent rapid replacement. In order to avoid the article to which the joint is fitted being out of operation for too long, it is, in all cases, necessary to prepare not only a stock of the joints, but also a stock of complete structures or of structural parts fitted with the joint. This is obviously not without serious disadvantages, especially when the joints used are subject to the risk of being damaged frequently or when in consequence of a single accident the joint is liable to become immediately inoperative as in the case of an inflatable joint.

In flatable joints are known, which are simply located in a slot or a groove of the structure so that one part projects thereinto during the inflation. In certain cases such joints are constituted by a kind of air chamber in which a slight pressure is permanently maintained so that they remain in place and then the pressure is increased to create a sort of bulge throughout the whole of the periphery said bulge effecting the sealing action. In other cases, such joints are, in the absence of inflation, engaged in the solt by friction, all or part of their walls engaging those of the slot, and inflation causing the part serving as the seal to project outwardly.

Unfortunately none of these fixings means is entirely satisfactory. They may be utilised only if the structure to which they are secured it itself fixed, because in the case of fixing to a movable structure, the fixing is insufficient for the joint to be held in place during the movements of the structure.

The present invention has for an object a sealing joint which may easily be put into place and replaced where necessary and which may be fixed to a movable structure as well as to a fixed structure.

The present invention has for another object particular embodiments of said joint which allow it to be used in numerous special cases.

The sealing joint according to the invention, whether or not an inflatable joint, comprises an annex protuberance which is independent of the sealing part of the joint, said annex being of a flexible and deformable material forming a channel which may be connected to one or more sources of fluid under pressure.

In order that the invention may be more clearly understood, reference will now be made to the accompanying drawings which show several embodiment of a sealing joint according to the invention purely by way of illustrative example, and in which:

FIGURE 1 shows a transverse section through one part of a joint according to the invention, FIGURE 2 shows a similar view to that of FIGURE 1 but with said sealing part in position on the part of a structure for which it forms a seal;

FIGURE 3 shows in transverse section another embodiment of a joint according to the invention, FIGURE 4 shows in perspective view a panel fitted with another embodiment of a joint according to the invention;

FIGURE 5 shows a perspective view of the door of the joint shown in FIGURE 4; and FIGURE 6 is a lateral view in longitudinal section along the line 6—6 of FIGURE 4.

FIGURE 1 shows in resting state, before mounting on the door, one part of an inflatable joint according to the invention. The inflatable sealing part 1 bears an inflatable fixing appendix 2, the chamber E of the sealing part and 3 of the fixing part of the joint being independent. The two parts 1 and 2 may be assembled one to the other, for example by gluing and/or vulcanisation. Alternatively, the joint may be composed of a single piece made by extrusion. The protuberance 2 is made from a material such as rubber which is deformable and impermeable; or it may be constituted by a fabric which is sealed by a suitable treatment, such as rubber coating or surfacing.

The protuberance 2 carries an entry valve (not shown in FIGURE 1 or 2) which is connectable to a source of a gaseous or liquid fluid under pressure. The protuberance also preferably carries a second valve (not shown in FIGURES 1 and 2) which enables the gases to be released when the protuberance is inflated by a fluid which is not ambient air. The valve or valves communicate with the recess 3.

In FIGURE 2 the joint of FIGURE 1 is mounted on a door 7 and applied against the perimeter of a fixed element B having an opening C closed by the door 7. Part 1 is inflated to ensure the sealing and the part 2 is inflated to ensure the fixing of the joint in the groove 4, rectangular in section, of the door. The independence of the parts 1 and 2 of the joint enables, if necessary, inflation of these parts at different pressures.

In the embodiment shown in FIGURES 1 and 2, the section of the protuberance is rectangular, but advantageously it may have a trapezoidal shape such as that shown in FIGURE 3, or any other concave shape, provided that its width at its upper part is less than or at most equal to its maximum transverse dimension. This ensures a better retention of the joint on the door.

In order to complete a joint according to the invention, the protuberance 2, which may have been partially inflated, is placed in the groove 4 of the counterpart structure and a gaseous or liquid fluid under pressure is introduced into the recess 3; if desired with the removal from the said recess of any residual fluid. Under the action of the fluid under pressure, the protuberance is inflated until its walls come into contact with the walls of the groove 4, and the pressure reaches a desired value, for example 1 kg./cm.$^2$, and the fluid admission valve is closed. By this means, a true keying or locking of the protuberance in the groove of the counterpart structure is effected.

In order to disassemble the joint, the fluid enclosed in the protuberance is released and the protuberance flattens and can be freed from the groove.

FIGURES 4 and 5 relate to a particular embodiment of a joint which is not confined to a single plane.

In these figures, a joint comprising an inflatable protuberance 5 secured to an active part 6 is located on a panel 7 which may be the panel of a sliding door; it is secured on three sides of the internal surface and on three sides of the lower surface.

FIGURE 4 shows the joint in position with respect to a structure comprising a fixed element B with an opening C which closes in sealing fashion by means of a door 7 provided with the joint. The door 7 is shown in dash-dotted line to enable the joint to be seen and the joint is shown in the non-inflated state. The door 7 may be connected to the fixed element B, in conventional manner, by hinges placed along a vertical side and opening by pivoting round the hinges, Alternatively the door may be hung on a horizontal rail on which it slides to be closed or opened. In these two cases it comprises also a locking means. These arrangements are conventional and do not form part of the invention and for this reason are not shown in the drawings. The figure illustrates the inflating valve D of the sealing part of the joint.

FIGURE 5 is a view of the door 7 seen from its front face to show the grooves M and N for fixing the joint.

FIGURE 6 shows the structure with the door 7 in closed position and the joint A in inflated position. The figure shows particularly how the lower part of the joint is applied on the sill 8 which extends the lower side of the opening C of the fixed element B.

In this particular embodiment, the active part 6 of the joint is itself inflatable, but this method of fixing the part may also be applied to a non-inflatable part.

The lower and internal stop 8 of the panel forming the counterpart structure of the joint is rounded. Of course, the member into which the counterpart structure is associated viz. the door-frame, in this instance, has a corresponding rounded shape.

When, as in this example, the rounded part has a small radius of curvature, it is preferable to interrupt the inflatable protuberance 5 at these points so that it is thus constituted of two distinct portions 5a and 5b. Each of the portions 5a and 5b carries an entry valve and a release valve; they are diagrammatically shown at 9, 11 and 10, 12 respectively. At the rounded parts, the seal is effected in spite of the absence of any protuberance due to the fact that the sealing part 6 of the joint, when it is inflated, is applied tightly, on the one hand, on the door-frame and, on the other hand, on the panel.

However, even when the sealing part is that of a non-inflatable joint, the pressure which serves to firmly apply said joint on the door-frame, applies it also against the panel so well that sealing is equally well effected.

In order to replace a joint according to the invention, fixed on the panel of a sliding door of two metres by 3 metres weighing 120 kg., at least 15 minutes is needed, this time comprising the time for assembling and disassembling the panel; the time necessary for the simple replacement of the sealing part is from 3 to 4 minutes. When the protuberance is inflated, the fixing of joints according to the invention is excellent.

I claim:

1. A sealing joint for providing a sealed closure between two members, said joint comprising an inflatable sealing part, first connecting means from said inflatable sealing part to a source of fluid under pressure, and at least one inflatable fixing protuberance extending from said inflatable sealing part, second connecting means for said protuberance to a source of fluid under pressure enabling inflation independently of said inflatable sealing part, said protuberance being adapted so as to be at least partially housable in at least one groove arranged on one said member and applicable against the walls of the groove when inflated so as to fix said inflatable sealing part on said one member and entirely external to said groove, said inflatable sealing part having a configuration with places of small radius of curvature, the fixing protuberance being interrupted at least at certain said places of small radius of curvature.

2. A sealing joint according to claim 1, wherein said connecting means comprise inflating valves.

3. A sealing joint according to claim 2, wherein said connecting means comprise in addition a purging valve.

4. A sealing joint according to claim 1, wherein said inflatable sealing part and said protuberance have a generally flat form in the noninflated state, the protuberance extending perpendicularly from the middle of a face of the inflatable sealing part so that the joint has at rest a T-shaped cross-section with an inflatable chamber in the horizontal portion of the T and an inflatable chamber in the vertical potrion of the T, each said chamber having connecting means to a source of fluid under pressure.

5. A sealing joint according to claim 1, wherein one member defines an opening of rectangular form and the other member comprises a door serving to close said opening, said inflatable sealing part being fixable in a groove on said door.

6. A sealing joint according to claim 1, wherein said inflatable sealing part is continuous, of generally rectangular shape and applicable on the whole of the periphery of a rectangular opening, a first inflatable protuberance extending from one face of the said inflatable sealing part and in continuous manner on three adjacent sides of the said inflatable sealing part, namely two vertical sides and the upper horizontal side, and a second inflatable protuberance extending from the lower horizontal side of said inflatable sealing part, the lower ends of the first protuberance being discontinued at a certain distance from the lower horizontal side to enable the curving to the desired shape of portions of the inflatable part not provided with fixing protuberances.

7. A sealing joint according to claim 1, wherein said groove is of rectangular section.

8. A sealing joint according to claim 1, wherein said groove is of trapezoidal section.

9. A structure comprising in combination a sealing joint, a fixed member defining an opening of rectangular form, a movable member serving to close said opening and an inflatable sealing part, first connecting means from said inflatable sealing part to a source of fluid under pressure, and at least one inflatable fixing protuberance extending from said inflatable sealing part, second connecting means from said protuberance to a source of fluid under pressure enabling inflation independently of said inflatable sealing part, said protuberance being adapted so as to be at least partially housable in at least one groove arranged on said movable member, and applicable against the walls of the groove when inflated so as to fix said inflatable sealing part on said movable member and entirely external to said groove, wherein said opening is bounded on two vertical sides and on its upper horizontal side by a plane vertical surface for the application of the joint, while the lower horizontal side of the opening is prolonged by a sill having a plane horizontal surface for the application of the joint, said vertical surfaces and horizontal surfaces for the application of the joint being connected by rounded parts.

10. A structure according to claim 9 and in which the movable closing member has a plane vertical front surface and a plane horizontal lower surface parallel to the plane horizontal surface of the sill, said vertical surfaces and horizontal surfaces of the movable member being connected by a rounded part and the movable member having at least the edge of the vertical surfaces and horizontal surfaces, grooves for the lodging of first and second protuberances of the inflatable sealing part.

References Cited

UNITED STATES PATENTS

| 2,036,781 | 4/1936 | Steenstrup | 49—489 X |
| 2,469,131 | 5/1949 | Ross | 49—477 |
| 2,763,038 | 9/1956 | Hagerty et al. | 49—477 X |
| 3,040,393 | 6/1962 | Dailey | 49—477 X |
| 3,161,229 | 12/1964 | Sanders | 49—477 X |
| 3,171,381 | 3/1965 | Meek | 277—34 X |
| 3,240,038 | 3/1966 | Schwegler. | |

FOREIGN PATENTS 647,650   12/1950   Great Britain.

DAVID J. WILLIAMOWSKY, Primary Examiner

P. C. KANNAN, Assistant Examiner

U.S. Cl. X.R.

49—489; 277—34.3